July 5, 1960
H. W. TREVASKIS ET AL
2,943,668
TIRE BUILDING APPARATUS
Filed Nov. 13, 1957
3 Sheets-Sheet 1
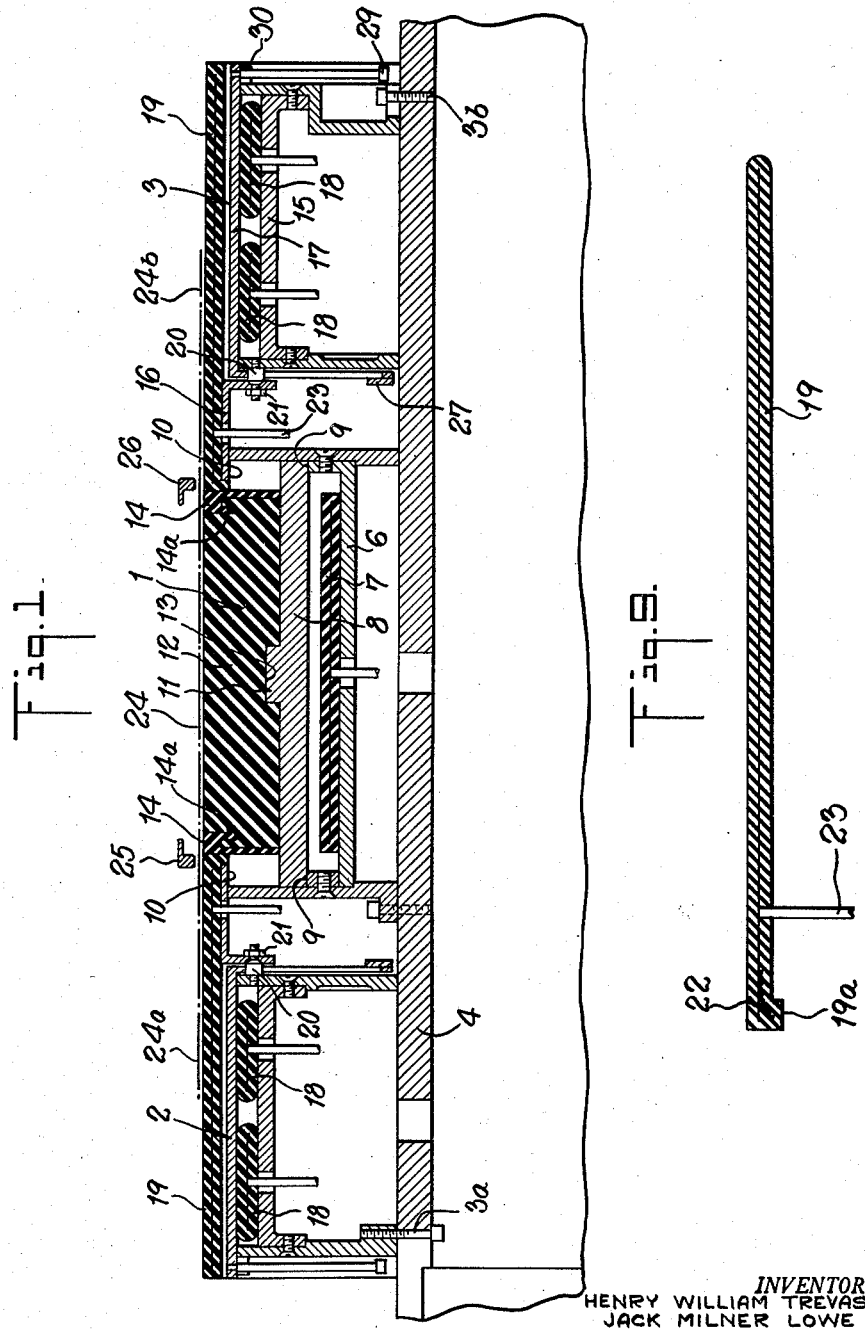
INVENTORS
HENRY WILLIAM TREVASKIS
JACK MILNER LOWE
BY
Benj. T. Rauber
ATTORNEY

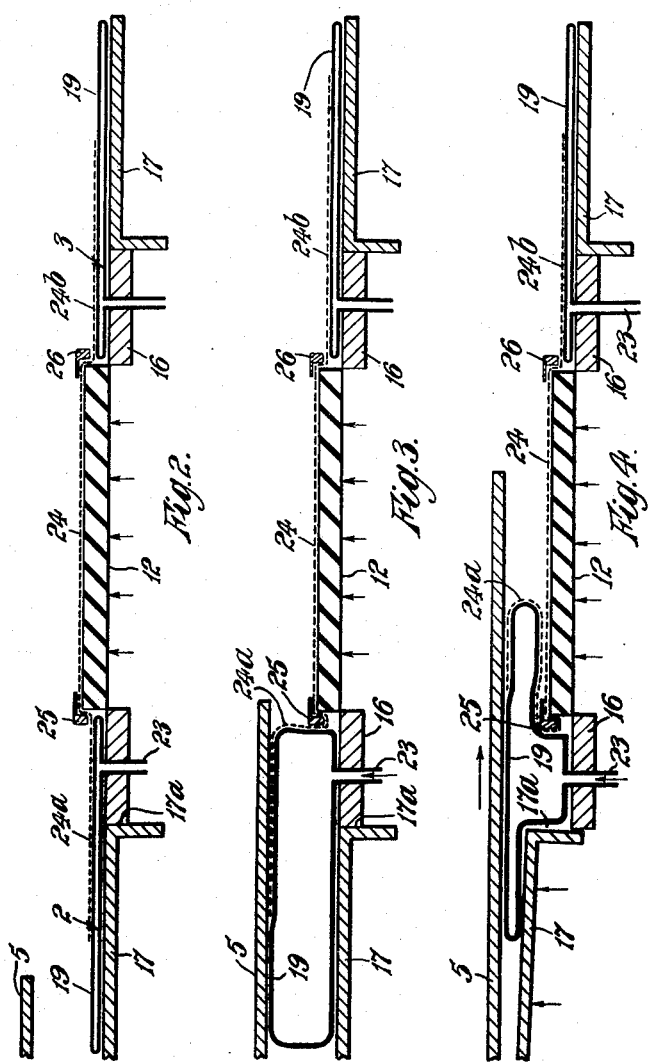

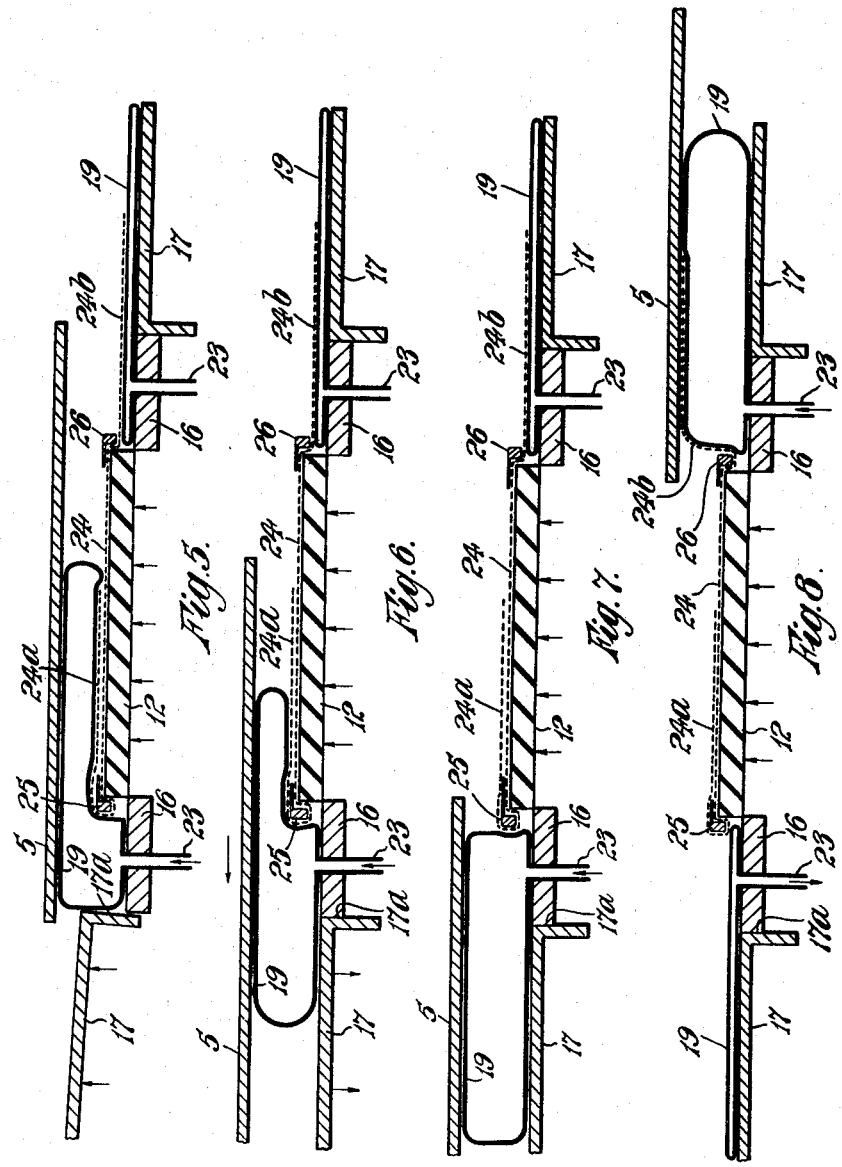

United States Patent Office 2,943,668
Patented July 5, 1960

2,943,668
TIRE BUILDING APPARATUS

Henry William Trevaskis, Point Pleasant, Blackdown, near Leamington Spa, and Jack Milner Lowe, Sutton Coldfield, England, assignors to Dunlop Rubber Company Limited, London County, England, a British company Filed Nov. 13, 1957, Ser. No. 696,156

Claims priority, application Great Britain Nov. 17, 1956

7 Claims. (Cl. 154—10)

This invention relates to tire building apparatus.

Tire building apparatus is known in which the turnover around bead wires of the side portions of a ply or plies wrapped around a building drum, is effected at each end by means of an inflatable air bag which is inflated against the inner periphery of the side portions of the ply so that the ply is forced into frictional contact with the inner periphery of a surrounding sleeve. The sleeve is then traversed by power driven means into telescoping relationship with the drum, and the side portion of the ply and inflated bag are carried with it until the ply is turned around the bead wire and laid onto the surface of the drum.

It is an object of the present invention to provide apparatus of this kind in which the traversing movement of the sleeve is achieved automatically upon inflation of the air bag without the provision of independent means.

According to the invention tire building apparatus comprises an expansible building drum, cylindrical supporting members located co-axially one at each end of the drum to support the side portions of tire building fabric extending beyond bead wires located adjacent to each side of the building drum, an annular air bag mounted on each supporting member, means for inflating each of the air bags, a sleeve freely movable telescopically over the drum and each supporting member, and abutment means associated with each of the supporting members for causing an axial movement of the bag from the associated supporting member towards and over the building drum on inflation of the associated air bag against the sleeve so as to effect turn-over of the fabric around the adjacent bead wire and onto the building surface of the drum.

In one form of the invention the abutment means causing the axial movement of the air bag comprises a shoulder formed on the supporting member, the shoulder being formed between a portion of the supporting member, extending from the drum, which is of approximately the same external diameter as the external diameter of the contracted building drum, and the remaining portion of the supporting member which can be expanded to a substantially greater diameter than the external diameter of the drum or which can be permanently of such a diameter. The axial movement is caused by pressure of the air bag against the shoulder.

In a preferred arrangement, each of the cylindrical supporting means incorporates an inflatable annular tube or tubes upon which is superposed one of the air bags. When the tube or tubes is or are deflated the overall diameter of each of the supporting means is substantially the same as that of the contracted drum. Inflation of the tube or tubes causes the formation of the said annular shoulder so that, upon inflation of the superposed air bag automatic movement of the bag and the sleeve axially over the expanded drum will take place, and upon deflation, since the overall diameter of the supporting means is smaller than that of the expanded drum, a second shoulder will be formed between the drum and the supporting means, and the inflated bag and the sleeve will move from over the drum to their original position over the supporting means.

One embodiment of the invention will now be described, with reference to the accompanying drawings, in which:

Figure 1 is a cross-sectional front elevation of apparatus in accordance with the invention;

Figures 2–8 are diagrammatic cross-sectional views of the apparatus of Figure 1 showing stages in its operation.

Figure 9 is an axial cross-sectional view of part of an air bag.

The apparatus comprises essentially an expansible building drum 1 and a pair of cylindrical supporting members 2 and 3 mounted co-axially one on each side of the building drum and attached to the shaft 4 by means of screws 3a and 3b respectively. The screws 3a and 3b pass through slots in the shaft 4 and a flanged portion of the supporting member 3 respectively, thus allowing axial adjustment of the members 2 and 3 relative to the drum 1. This assembly is mounted as a unit on a hollow supporting shaft 4 carried in a pair of spaced-apart bearings (not illustrated) mounted in pedestals (not illustrated) located outboard of one of the supporting members.

A sleeve 5 of diameter somewhat greater than the outside diameter of the unexpanded supporting members 2 and 3 is mounted co-axially with the above-mentioned unit and is freely movable from a disengaged position to positions surrounding either of the supporting members 2 and 3 and into a position surrounding the building drum 1 as and for the purpose described hereinafter.

The apparatus will now be described in more detail.

The extensible building drum 1 comprises a cylindrical shell 6 upon which is co-axially mounted an annular fabric reinforced inflatable tube 7, and surrounding the tube are located a plurality of rigid segments 8, each segment having a portion at each end which locates, in the collapsed state of the drum, with an annular surface 9 and with a second annular surface 10 when the drum is in the expanded state. In the collapsed state, the segments 8 are separated by a small clearance space but otherwise surround the entire circumference of the tube 7. Each of the segments 8 is provided substantially midway between its ends with a radially outwardly extending projection 11. A resilient rubber sleeve 12 of substantial thickness surrounds the segments 8, the outer periphery of the sleeve 12 forming the building surface of the drum and the inner periphery of the sleeve having an annular slot 13 formed substantially midway between the end faces thereof within which the projections 11 on the segments locate. This axially locates the sleeve 12 in position. Detachable rubber shoulder rings 14, having projecting ribs 14a on their inner surfaces for engagement with corresponding grooves on the sleeve 12, are fitted, one at each of its ends.

The supporting members 2 and 3 are each of similar design and are attached one to each side of the building drum 1. One only will therefore be described. Each supporting member comprises two rigid cylindrical shells 15 and 16 supported co-axially with the building drum 1 on the shaft 4 and secured together in spaced relationship by studs 20 and nuts 21. The outside diameter of the shell 16 is smaller than the outside diameter of the rubber sleeve 12 of the building drum 1 when this is in the collapsed state. A plurality of rigid segments, 17, which in the contracted state fit together in cylindrical form, surround the cylindrical shell 16 and a thin rubber sleeve (not shown) surrounds the segments 17. A pair of co-axial inflatable fabric-reinforced tubes 18 is located between the segments 17 and the shell 15 and are inflatable so that the overlying segments 17 are disposed on a pitch circle of increased diameter.

An inflatable annular air bag 19 is located co-axially with each supporting member so as to extend over the segments 17 and over the non-expansible cylindrical shell 16. The leading edge 19a (see Figure 9) of the portion of the bag 19 overlying the cylindrical shell 16 is a close fit therewith and is reinforced with circumferentially extending turns of inextensible wire 22, thus preventing the inner surface of the bag from expanding and the bag from sliding away from the building former during expansion of the supporting member. An inflation valve 23 for the bag 19 is provided and extends radially inwardly into the bag and through the cylindrical portion 16. The outside diameter of the collapsed air bag 19 is the same as the outside diameter of the contracted rubber sleeve 12 of the building drum 1.

In the apparatus illustrated in Figure 1, the segments 17 take up a frusto-conical form tapering towards the building drum, when fully expanded. Stop plates 27 attached to the segments 17 engage with the flange 28 so as to limit the radial expansion of the segments 17 at the end nearer to the building drum. The portions of the segments 17 at the end remote from the building drum are allowed to expand to a greater radius than that of the segments at the other end, and their expansion is limited by the engagement of the head of a bolt 29, attached to each of the segments, with a stop 30 rigidly connected to the cylindrical shell 15.

The sleeve 5 is supported by bearings (not illustrated) on a cantilever arm (not illustrated) which projects from one of the pedestals earlier referred to. The sleeve 5 is movable manually from a disengaged position into the required position and is capable of passing over the drum and supporting members.

Means (not illustrated) are provided for locating bead wires in position adjacent to the shoulders 14. These means comprise a pair of transversely divisible annuli, located on cantilever arms in predetermined axially spaced-apart relationship, for holding the beads at the correct axial distance from one another, the annuli being slidable over the unexpanded supporting member 2 and drum 1 and their axial movement being limited by stops so as to locate the beads in the required position. The annuli may then be divided, to release the beads, and removed to a position clear of the rest of the apparatus.

An electric motor (not illustrated) is mounted adjacent to the shaft 4 and is drivably connected thereto.

The operation of the apparatus just outlined will now be described.

With the drum 1 and each of the supporting members 2 and 3 in the collapsed state and with the sleeve 5 located in the disengaged position, a ply 24 of tire building fabric is wrapped around the building drum (see Figure 2) and joined in the usual manner, side portions 24a and 24b of the ply of equal width extending one over each of the air bags 19 forming the outer periphery of each of the supporting members 2 and 3 respectively. Bead wire assemblies 25 and 26, carried in the transversely divisible annuli, are passed over the ply 24 from the end of the apparatus remote from the pedestal bearings and located in position adjacent to the shoulder rings 14 attached to the rubber sleeve 12 of the building drum.

The annuli are each divided transversely so as to disengage them from the bead wires and the annuli are then removed to a position clear of the rest of the apparatus. The building drum is expanded by inflating the associated inner tube 7, the ply 24 being expanded so that each of the beads 25 lies against a shoulder ring 14.

The sleeve 5 is then manually moved into position so that it surrounds along its whole length the air bag 19, located on the supporting member 2 (see Figure 3), and the overlying side portion 24a of the ply 24 and slightly overlaps the building drum. This air bag is then inflated so that the side portion 24a of the ply is expanded and pressed into frictional contact with the internal peripheral surface of the sleeve 5.

The inner tubes 18 associated with the supporting member 2 are then inflated so that the segments 17 are expanded to frusto-conical shape (see Figure 3), the shoulder-forming portion 17a thus being raised clear of the non-expansible cylindrical portion 16 of the supporting member 2. Pressure of the air bag 19 against this shoulder causes the bag 19 to move automatically axially over the building drum away from the shoulder 17a (see Figure 4), carrying with it the freely supported sleeve 5 and the side portion 24a of the ply, which is turned around the adjacent bead wire 25 and laid flat upon the surface of the expanded building drum 1. Movement of the bag continues until the bag rides over the shoulder 17a formed by the segments 17 (see Figure 5). The bag will then lie in abutting relationship with this shoulder until the tubes 18 are deflated. When this is effected the segments 17 are collapsed, and on account of the fact that the building drum is still in its expanded state, the pressure of the air bag 19 on the bead wire 25, located on the shoulder ring 14 of the building drum, causes a reverse axial movement of the air bag 19 and consequent movement of the sleeve 5 until the air bag 19 is returned to its original position.

The tapering shape of the supporting members serves to produce the maximum axial thrust on the rolling bag 19 at the beginning of the turn-over operation, when a greater thrust is necessary, and gradually to reduce the axial thrust to a minimum value at the end of the turn-over operation, thus reducing any tendency for the bag to override at the end of the operation. This tendency may cause excessive strain to be placed on the rolling bag valves 23 and on any region of the bag 19 which may be bonded, adhered or otherwise secured to the shell 16.

The same operations in connection with the other supporting member 3 result in the turnover of the other side portion 24b of the ply 24 around the other bead wire 26, and when this has been effected the building of the tire may be completed, the drum collapsed and the assembled tire removed.

In the manufacture of tire covers it is necessary, on account of the varying quality of materials used from day to day, e.g., varying moisture content of cotton or rayon cords, to allow for a small adjustment of the width of tire band manufactured so that when the band is formed in a mould, the resulting tire will be of uniform construction despite the above-mentioned variations. In practice the small adjustment of width is achieved by varying the width of the drum.

The apparatus just described may be adjusted for the assembly of tire bands of different widths by fitting shoulder rings of appropriate thickness to each end of the rubber sleeve 12. The axial positions of the supporting members 2 and 3 on the shaft 4 are correspondingly altered.

In the embodiment described, the air bags 19 are reinforced in the region adjacent to the building drum, but this region may alternatively or additionally, be secured to the surface of the cylindrical shell 16 by bonding thereto.

Having now described our invention—what we claim is:

1. Tire building apparatus comprising an expansible building drum, cylindrical supporting members located coaxially of said drum, one at each end of the drum to support the side portions of tire building fabric extending beyond bead wire emplacements, each supporting member comprising a series of rigid elements extending side by side in a cylindrical formation co-axial with the drum, means to move said elements to a conical structure tapering radially inwardly toward the drum, a sleeve of larger diameter than that of said drum co-axial with and spaced radially outwardly from said drum and movable axially from a position overlying said supporting elements to a position overlying said drum, and annular air bags, one mounted on each of said supports and overlying said elements within said sleeve and inflatable to move over said drum and to move said sleeve over said drum.

2. The building apparatus of claim 1 in which said means to move said elements to said conical structure comprises an air tube supported within said series of elements and inflatable to move said elements radially outwardly, and stops to limit the outward movement of said elements to a relatively smaller diameter at the end nearest the drum and to a larger diameter at the end further from the drum.

3. Tire building apparatus according to claim 1 wherein the expansible building drum comprises a cylindrical shell having co-axially mounted thereon an inflatable annular tube, a plurality of axially extending rigid segments surrounding the shell and tube, means for inflating the tube so that the overlying segments are disposed on a pitch circle of increased diameter, and a sleeve of resilient expansible material surrounding the segments.

4. Tire building apparatus according to claim 3 wherein a radially outwardly extending projection is formed on each segment engaging with an annular slot formed on the inner periphery of the surrounding sleeve so as to locate the sleeve relative to the segments.

5. Tire building apparatus according to claim 3 wherein a shoulder ring of resilient expansible material is detachably attached to an end of the drum sleeve.

6. Tire building apparatus according to claim 1 wherein in the case of each air bag a portion of the air bag lying in contact with a part of the surface of the associated supporting member adjacent to the building drum is reinforced with circumferentially extending turns of inextensible wire.

7. The tire building apparatus of claim 1 in which the outside diameter of the cylindrical supporting members when not moved to a conical structure is less than the outside diameter of the expanded building drum.

References Cited in the file of this patent
UNITED STATES PATENTS

| | | |
|---|---|---|
| 2,251,904 | Breth et al. | Aug. 12, 1941 |
| 2,715,931 | Frazier | Aug. 23, 1955 |